March 3, 1953   W. A. BROWN   2,629,980
GUARD FOR SICKLE BLADE OF HARVESTING MACHINES
Filed Aug. 11, 1950   2 SHEETS—SHEET 2
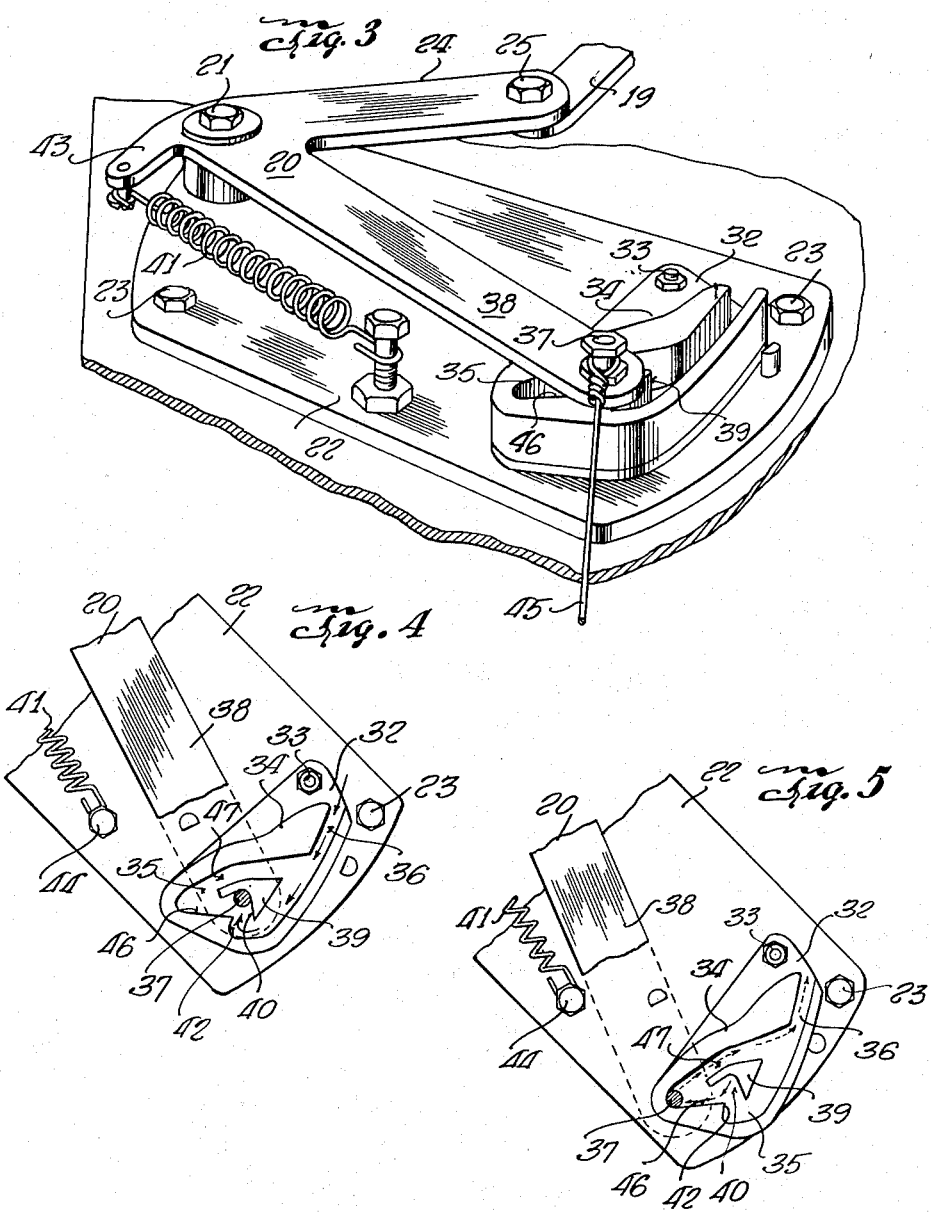
W. A. BROWN
INVENTOR.
BY
ATTORNEY Patented Mar. 3, 1953

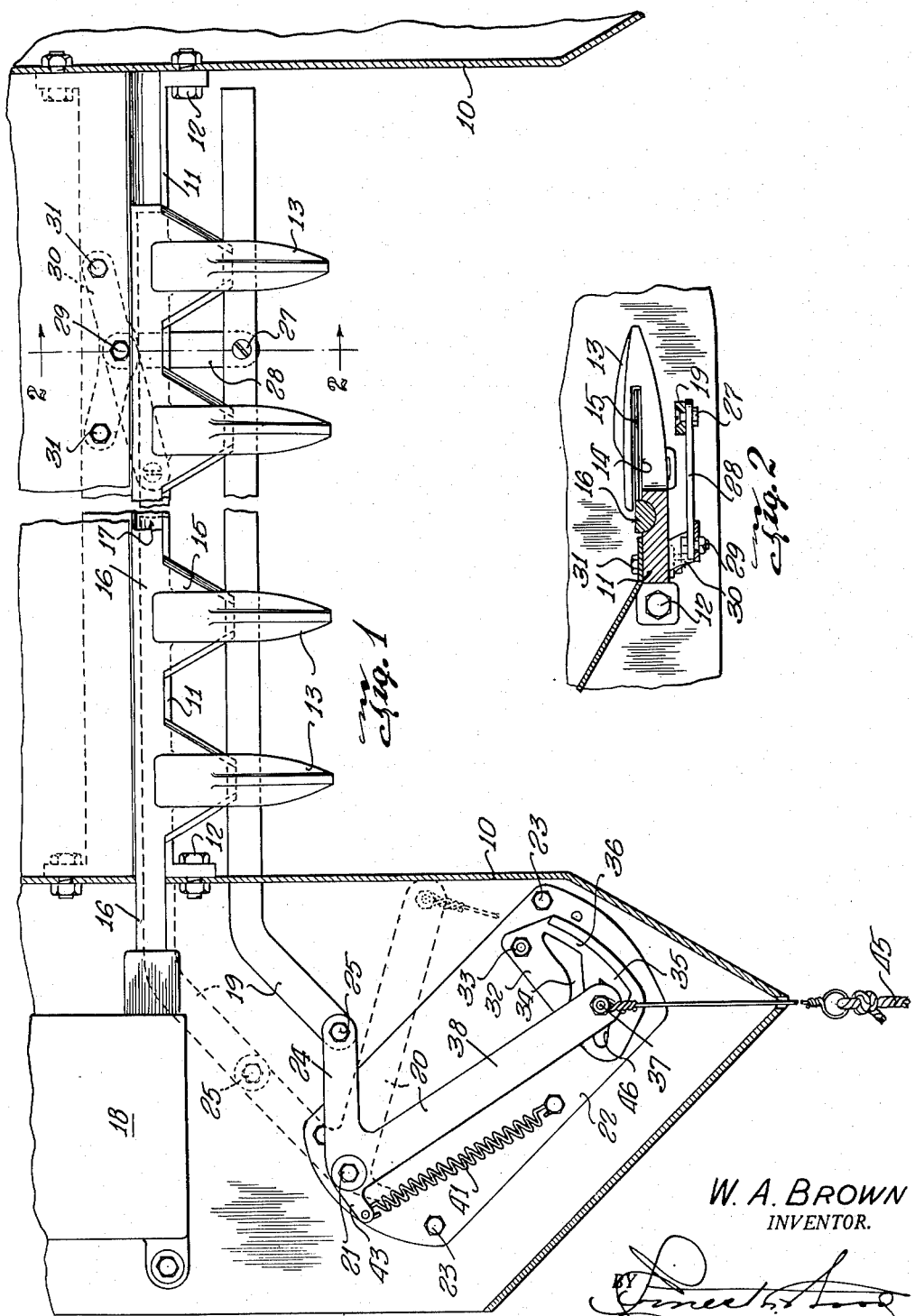

2,629,980

UNITED STATES PATENT OFFICE 2,629,980

GUARD FOR SICKLE BLADE OF HARVESTING MACHINES

Wallace A. Brown, Harper, Tex., assignor of one-half to William L. McGinley, Dallas, Tex.

Application August 11, 1950, Serial No. 178,841

5 Claims. (Cl. 56—298)

This invention relates to grain harvesting machines and it has particular reference to certain improvements in the cutter bar through which the sickle is protected against damage by contact with foreign growth in the field of grain.

In the harvesting of various types of grain crops foreign vegetation such as sunflowers, is sometimes encountered whose tough stalks frequently cause damage to the sickle. To avoid the growth, the harvester operator elevates the cutter bar above the same and returns it to operative position after passing to resume cutting of the grain. This practice results in the loss of considerable grain since the cutter bar cannot be lowered quickly enough after by-passing the foreign growth to avoid escaping much of the grain standing adjacent to the growth of damaging weeds. It is therefore the principal object of the invention to provide an attachment for the cutter bar of a harvesting machine, disposed to lie under and transversely of the guard fingers of the bar and capable of displacement longitudinally of the fingers to assume an operative position in advance of the sickle blade, thus to shield the latter against tough foreign growth without the necessity of raising the cutter bar out of the path of such growth.

Another object of the invention is to provide a novel form of operating means for the sickle blade guard, which is comprised of a bell crank having pivotal connection with the blade guard and a pivoted plate having a cam track for guiding an arm of the bell crank and so designed that successive pulls on a cable attached to the guided arm of the bell crank will be effective to alternately lock and unlock the blade guard with respect to its operative position in relation to the sickle blade.

Other objects will appear as the description proceeds, taken in connection with the accompanying drawing wherein:

Figure 1 is a fragmentary plan view of the cutter bar assembly of a harvesting machine, partly in section and showing the invention installed.

Figure 2 is a view in transverse section, taken on line 2—2 of Figure 1.

Figure 3 is a perspective view of the bell crank and control means for actuating the sickle blade guard.

Figure 4 is a fragmentary plan view showing the bell crank locking plate and illustrating locked position of the bell crank, and Figure 5 is a view similar to Figure 4 showing another position of the bell crank in relation to the locking plate.

Continuing with a more detailed description of the drawing, reference is primarily made to Figure 1 wherein numeral 10 denotes the shoes on opposite sides of the cutter bar assembly, between which extends the cutter bar support 11, bolted at 12 at its ends to respective shoes 10. Formed at spaced intervals along the forward edge of the member 11 is a series of guard fingers 13, slotted at 14 to receive the cutter blade or sickle 15. The cutter bar 16 is substantially half-round in transverse section and is longitudinally reciprocable in a similarly shaped, longitudinal groove 17 in the top of the member 11. One end of the sickle bar 16 enters a housing 18 which contains the conventional mechanism for imparting reciprocating motion to the bar 16.

Ordinarily, the sickle blade 15 is entirely unprotected from damaging obstacles in the path of the harvesting machine and while most grain fields have been cleared of permanent obstacles such as rock mounds, stumps and the like, it is most difficult to obviate temporary but tough weeds whose stalks become sturdy during a single season and which inflict serious damage to the blade 15 if the latter is allowed to be brought up against such growth. The invention therefore provides a guard in the form of a bar 19 which extends the length of the cutter bar 16 and in parallelism therewith. This bar 19 is disposed under the finger assembly 13 and is inoperatively situated well to the rear of the cutting edge of the sickle blade 15. However, the operative position of the sickle blade guard bar 19 is forwardly of the points of the blade 15, as shown in solid lines in Figure 1, to which position it is moved when the sickle approaches obstacles likely to damage the blade. The heavy or tough growth, such as sunflower stalks and the like strike harmlessly against the sturdy guard bar 19 while the blade 15 continues to reciprocate and when the growth is by-passed, the bar 19 is retracted and the blade 15 proceeds with the cutting of grain with little or no loss.

To operate the guard bar 19 from the operator's position on the draft implement, a bell crank 20 is pivoted at 21 to a plate 22, the latter being secured by bolts 23 to the bottom of one of the shoes 10 of the cutter assembly. One arm 24 of the bell crank is pivoted at 25 to the outwardly turned end 26 of the guard bar 19, as shown in Figure 1 in order that the bar will be laterally displaced when the bell crank is rocked on its pivot 21, in the manner to be presently explained.

At a point spaced inwardly from the opposite end of the guard bar 19 is pivoted at 27 one end of a link 28. The opposite end of the link is pivoted at 29 to the midsection of bracket 30, the latter being affixed by bolts 31 to the cutter bar support 11, as shown in Figure 2. The described arrangement supports the outer end of the guard bar 19 for oscillative displacement in the manner previously set forth.

The locking means for the guard bar 19 consists of a plate 32 which is pivoted at 33 to the mounting plate 22 adjacent one end thereof. The pivoted plate 32 has formed on one face thereof a boss 34. A cavity 35 is formed in the boss 34 having a single access passage 36 through which is moved a pin 37 depending from the end of the arm 38 of the bell crank, as the latter is oscillated on its pivot 21.

Within the confines of the cavity 35 of the boss 34 is an island 39 which has a recess 40 into which the pin 37 of the bell crank is caused to move under force of a coil spring 41 by virtue of a protuberance 42 in the cavity wall opposite the recess 40. The spring 41 is attached at one end to a projecting arm 43 on the bell crank at its pivot point. The opposite end of the spring is attached to a bolt 44 rising from the mounting plate 22 and exerts a force tending to move the long arm 38 of the bell crank 20 away from the pivoted plate 32.

A rope or cable 45 is attached at one end to the end of the long arm 38 of the bell crank 20 and extends to the operator's seat on the draft implement. By exerting a pull on the cable 45, the bell crank is actuated to cause its arm 38 to move towards the boss 34 of plate 32, under tension of spring 41. The pin 37 carried by the arm 38 will enter the passage 36, as indicated by the arrows in Figure 4 and upon engaging the protuberance 42 in the wall of the cavity 35, the pin will cause the plate 32 to move slightly on its pivot 33 so that, when the cable 45 is slackened, the pin will fall in the recess 40 of the island 39, also under tension of the spring 41. When thus positioned, the pin 37 will prevent further displacement of the bell crank to hold the guard bar 19 in operative position in relation to the sickle blade 15, until the cable 45 is again pulled.

To release the guard bar 19 so that it will assume inoperative position, a pull on the cable 45 will displace the bell crank on its pivot to move the pin 37 out of the recess 40 and against the inclined face 46 of the cam track or wall of the cavity 35. Pressure of the pin against this inclined face will thrust the plate 32 to one side so that the pin 37 may travel interruptedly through a passage 47, in the direction of the arrows in Figure 5, thence out of the cavity through the passage 36 with which passage 47 communicates. Alternate movement of the guard bar into operative and inoperative positions is accomplished simply by successive pulls on the rope or cable 45.

Although the invention has been described in connection with the sickle of a grain harvesting machine, it is clearly evident that it will function for like purpose and with equal efficiency on the sickle of a mowing machine for cutting any standing grass, weeds or the like as a protection for the sickle against damage by obstacles in its path.

Manifestly, the construction as shown and described is capable of some modification and such modification as may be construed to fall within the scope and meaning of the appended claims is also considered to be within the spirit and intent of the invention.

What is claimed is:

1. In a sickle assembly comprised of a sickle bar and a reciprocating sickle, a guard for said sickle comprising a bar suspended from said sickle bar and movable to a position in advance of said sickle in the operation of the latter, and retractible to a position rearwardly thereof, a bell crank having an arm pivoted to an end of said movable bar, spring means in control of said bell crank for normally urging said movable bar to retracted position, a pivoted plate having a cam track, a pin carried by another arm of said bell crank adapted to enter and emerge from said cam track, means for actuating said bell crank and means within said cam track for receiving and holding said pin under tension of said spring means for locking said movable bar in advance of said sickle.

2. The structure of claim 1 in which the cam track is defined by a cavity having a protuberance in the wall thereof and an island within the confines of the cavity wall having a recess opposite said protuberance to receive the pin of the bell crank deflected by said protuberance during travel of said pin in said cam track.

3. In a sickle, a guard and operating means therefor comprising a bar disposed under and parallel with the cutting edge of said sickle and adapted for movement into and out of a position in advance of said cutting edge, a pivoted plate having a circuitous cam track provided with a common entrance and exit, an oscillatable bell crank having an arm pivoted to an end of said bar and another arm carrying a pin adapted to enter and emerge from said cam track as said bell crank is oscillated to respectively move said bar to operative and inoperative positions, means biasing said bell crank to normally urge said bar into operative position, means for actuating said bell crank and means in said cam track for receiving and holding said pin to lock said bar in operative position.

4. In a sickle assembly comprised of a sickle bar and a reciprocable sickle, a guard for said sickle comprising a member substantially coextensive with and disposed under said sickle and adapted to be moved to positions in advance and rearwardly of said sickle, means for operating said sickle guard comprising a bell crank pivoted by one arm to an end of said guard, a pivoted plate having a cavity, a recessed island within the confines of said cavity and defining with the walls of the latter a circuitous cam track, a pin on another arm of said bell crank adapted to move in said cam track, spring means resisting movement of said bell crank and tending to displace said pin from said cam track and means in the wall of said cavity for directing said pin into the recess of said island under tension of said spring means to lock said sickle guard in operative position.

5. In a sickle for harvesting machines, a sickle guard and operating means therefor comprising a bar supported under said sickle in parallelism with its cutting edge and adapted for lateral displacement to points in advance of and rearwardly of said sickle cutting edge, a bell crank having one arm pivoted to one end of said bar and spring biased to normally urge said bar to retracted position in relation to said sickle cutting edge, an oscillatably pivoted plate having a cavity defining a circuitous cam track, a pin in the companion arm of said bell crank adapted to enter and travel through said cam track when said bell crank is operated and means formed in said cam track for releasably holding said pin against the resistance of said spring to restrain said bar in advanced position in relation to said sickle cutting edge.

WALLACE A. BROWN.

REFERENCES CITED

The following references are of record in the file of this patent:

UNITED STATES PATENTS

| Number | Name | Date |
|---|---|---|
| 334,723 | Potee | Jan. 19, 1886 |